No. 732,410. PATENTED JUNE 30, 1903.
C. H. HOMAN.
MANUFACTURE OF SILICON AND ALUMINIUM FROM SILICATES OF ALUMINA.
APPLICATION FILED OCT. 13, 1902.
NO MODEL.
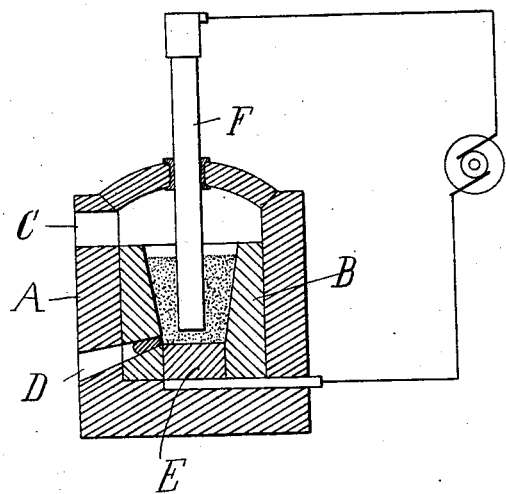
WITNESSES
H. M. Kuehne
Walter Donaldson
INVENTOR
Christian Harrebow Homan
BY Richards & Co
ATTORNEYS No. 732,410.

Patented June 30, 1903.

UNITED STATES PATENT OFFICE.

CHRISTIAN HARREBOW HOMAN, OF CHRISTIANIA, NORWAY.

MANUFACTURE OF SILICON AND ALUMINIUM FROM SILICATES OF ALUMINA.

SPECIFICATION forming part of Letters Patent No. 732,410, dated June 30, 1903.

Application filed October 13, 1902. Serial No. 127,177. (No specimens.)

*To all whom it may concern:*

Be it known that I, CHRISTIAN HARREBOW HOMAN, a subject of the King of Sweden and Norway, residing at Christiania, Norway, have invented certain new and useful Improvements in the Manufacture of Silicon or Silicon and Aluminium; and I do hereby declare the following to be a full, clear, and exact description of the invention, such as will enable others skilled in the art to which it appertains to make and use the same.

My invention relates to improvements in the manufacture of silicon from silicates of alumina or in the treatment of materials containing such silicates—as, for instance, common clay—for the purpose of obtaining silicon or ferrosilicon, or both, and a slag which may be utilized for the production of aluminium.

In carrying out my process a silicate of alumina—as, for instance, common clay—is heated in an electric furnace or in any other furnace capable of producing the necessary temperature—for instance, a powerful gas-furnace—with a reducing agent in such quantity that the silicic acid and certain bases—for instance, $Fe_2O_3$—are reduced, while the oxid of aluminium remains unreduced, and the resulting product from this reducing process will be silicon, together with the metals of the respective bases, and a slag substantially containing oxid of aluminium. If other silicon products are to be obtained separately—for instance, ferrosilicon—the reduced silicon may be tapped out at different stages of the process, obtaining thereby at one stage of the process pure silicon and at another stage ferrosilicon. As a reduction agent metallic aluminium is preferably used. During the smelting process the aluminium combines with oxygen from the silicic acid and from the reducible bases, and the slag consists of the oxid of aluminium thus formed, together with the oxid of aluminium from the silicate and commonly small quantities of unreducible bases—such as lime, magnesia, and alkali. The slag thus obtained may be utilized for the production of aluminium in any well-known manner, and in this manner not only the aluminium originally contained in the silicate will be obtained, but also the aluminium used as a reduction agent will be regenerated. The reduction of the silicate by aluminium begins to take place at temperatures not very far above the melting-point of aluminium. The object of raising the temperature by the aid of powerful furnaces, such as the electric or very effective gas furnaces, is to intensify the reaction, so as to reduce all the silicon and to keep melted the alumina slag, so that it may separate completely from the silicon. For these reasons it is most practical to place the working temperature of the furnace at about 4,500° Fahrenheit, although the reaction, as mentioned, has a very wide range of temperature.

The annexed drawing illustrates an electric furnace suitable for carrying out my invention, the drawing being a vertical cross-section through such furnace.

A is the external brickwork, and B the inner lining, of the furnace.

C is an opening through which the furnace may be charged, and D is a hole for tapping out the contents when molten.

E is a stationary electrode on the bottom of the furnace, and F an adjustable electrode entering the furnace from the top. The electrodes may be out of carbon.

I may carry out my process, using a fire-proof clay as raw material, consisting of the following substances: $SiO_2$ equals forty-seven per cent., $Al_2O_3$ equals thirty-eight per cent., $Fe_2O_3$ equals three per cent., $MgO$ equals 0.25 per cent., $K_2O$ equals 0.25 per cent., and $H_2O$ equals 13.5 per cent. To one hundred parts (by weight) of this clay is used 28.6 parts (by weight) of aluminium. The reactions will be the following:

$$3SiO_2 + 4Al = 3Si + 2Al_2O_3.$$

$$Fe_2O_3 + 2Al = Al_2O_3 + 2Fe.$$

$$3FeO + 2Al = Al_2O_3 + 3Fe.$$

What I claim is—

1. The herein-described method of treating materials containing silicates of alumina for the purpose of obtaining silicon and other valuable products consisting in mixing the materials with so much of a reducing agent that the silicic acid and basic impurities in the material may be reduced but leaving the aluminium oxid unreduced, heating the mixture so that such reduction takes place and tapping off the products obtained separately.

2. The herein-described method of manufacturing silicon from silicates of alumina consisting in mixing the silicates with metallic aluminium exposing the mixture to a high temperature in an electric or other furnace, thereby reducing the silicic acid and finally tapping off the silicon so obtained and the slags and other products separately.

3. The herein-described method of treating materials containing silicates of alumina, such as common clay, for the purpose of obtaining silicon and a slag containing aluminium oxid consisting in mixing the material with metallic aluminium in pulverized form exposing the mixture to a high temperature in an electric or other furnace, thereby reducing the silicic acid wholly or partly and also reducing other reducible bases and finally tapping off the resulting products separately.

In witness whereof I have hereunto set my hand in presence of two witnesses.

CHRISTIAN HARREBOW HOMAN.

Witnesses:
JOH VAALER,
O. MÜLLER.